US006233561B1

(12) United States Patent
Junqua et al.

(10) Patent No.: US 6,233,561 B1
(45) Date of Patent: May 15, 2001

(54) METHOD FOR GOAL-ORIENTED SPEECH TRANSLATION IN HAND-HELD DEVICES USING MEANING EXTRACTION AND DIALOGUE

(75) Inventors: Jean-Claude Junqua; Roland Kuhn; Matteo Contolini; Murat Karaorman; Ken Field; Michael Galler, all of Santa Barbara; Yi Zhao, Goleta, all of CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/290,628

(22) Filed: Apr. 12, 1999

(51) Int. Cl.[7] .................................................. G10L 15/22
(52) U.S. Cl. ......................... 704/277; 704/257; 704/275
(58) Field of Search ..................................... 704/200, 257, 704/277, 270, 272, 274, 275, 251, 255, 246, 250, 8, 4, 2, 9

(56) References Cited

U.S. PATENT DOCUMENTS

| | | | |
|---|---|---|---|
| 5,418,717 | * 5/1995 | Su et al. | 364/419.08 |
| 5,642,519 | * 6/1997 | Martin | 704/255 |
| 5,839,106 | * 11/1998 | Bellegarda | 704/257 |
| 6,154,720 | * 11/2000 | Onishi et al. | 704/2 |
| 6,173,279 | * 1/2001 | Levin et al. | 707/5 |

FOREIGN PATENT DOCUMENTS

2000250589-A * 9/2000 (JP) ............................... G06F/17/27

OTHER PUBLICATIONS

Kuhn, Roland and De Mori, Renato; Spoken Dialogues with Computers; 1998; pp. 485–522.

* cited by examiner

Primary Examiner—Richemond Dorvil
(74) Attorney, Agent, or Firm—Harness, Dickey & Pierce, P.L.C.

(57) ABSTRACT

A computer-implemented method and apparatus is provided for processing a spoken request from a user. A speech recognizer converts the spoken request into a digital format. A frame data structure associates semantic components of the digitized spoken request with predetermined slots. The slots are indicative of data which are used to achieve a predetermined goal. A speech understanding module which is connected to the speech recognizer and to the frame data structure determines semantic components of the spoken request. The slots are populated based upon the determined semantic components. A dialog manager which is connected to the speech understanding module may determine at least one slot which is unpopulated based upon the determined semantic components and in a preferred embodiment may provide confirmation of the populated slots. A computer generated-request is formulated in order for the user to provide data related to the unpopulated slot. The method and apparatus are well-suited (but not limited) to use in a hand-held speech translation device.

31 Claims, 7 Drawing Sheets

METHOD FOR GOAL-ORIENTED SPEECH TRANSLATION IN HAND-HELD DEVICES USING MEANING EXTRACTION AND DIALOGUE

BACKGROUND AND SUMMARY OF THE INVENTION

The present invention relates generally to speech analysis systems, and more particularly to computer-implemented natural language parsers.

Dialog can be described as effective communication between two or more parties. An effective communication necessitates the participation of at least two parties. If two participants are attempting to engage in dialog, but they have no common language, then their communication cannot be effective, resulting in the lack of dialog. Another important aspect of dialog is turn-taking. An effective dialog consists of turns (or chances to speak) by each of the participants.

Present computer-implemented speech processing systems for translation lack the natural back-and-forth turn-taking nature of a dialog. Typically, these systems are passive systems which slavishly translate the speech involved in a dialog. The present systems take little or no active role in directing the dialog in order to help the dialog participant(s) achieve a goal, such as purchasing an airplane ticket.

The present invention overcomes the aforementioned disadvantages as well as other disadvantages. In accordance with the teachings of the present invention, a computer-implemented method and apparatus is provided for processing a spoken request from a user. A speech recognizer converts the spoken request into a digital format. A frame data structure associates semantic components of the digitized spoken request with predetermined slots. The slots are indicative of data which are used to achieve a predetermined goal. A speech understanding module which is connected to the speech recognizer and to the frame data structure determines semantic components of the spoken request. The slots are populated based upon the determined semantic components. A dialog manager which is connected to the speech understanding module may determine at least one slot which is unpopulated based upon the determined semantic components and in a preferred embodiment may provide confirmation of the populated slots. A computer generated-request is formulated in order for the user to provide data related to the unpopulated slot.

For a more complete understanding of the invention, its objects and advantages, reference should be made to the following specification and to the accompanying drawings.

DESCRIPTION OF THE PREFERRED EMBODIMENT

Figure 1:
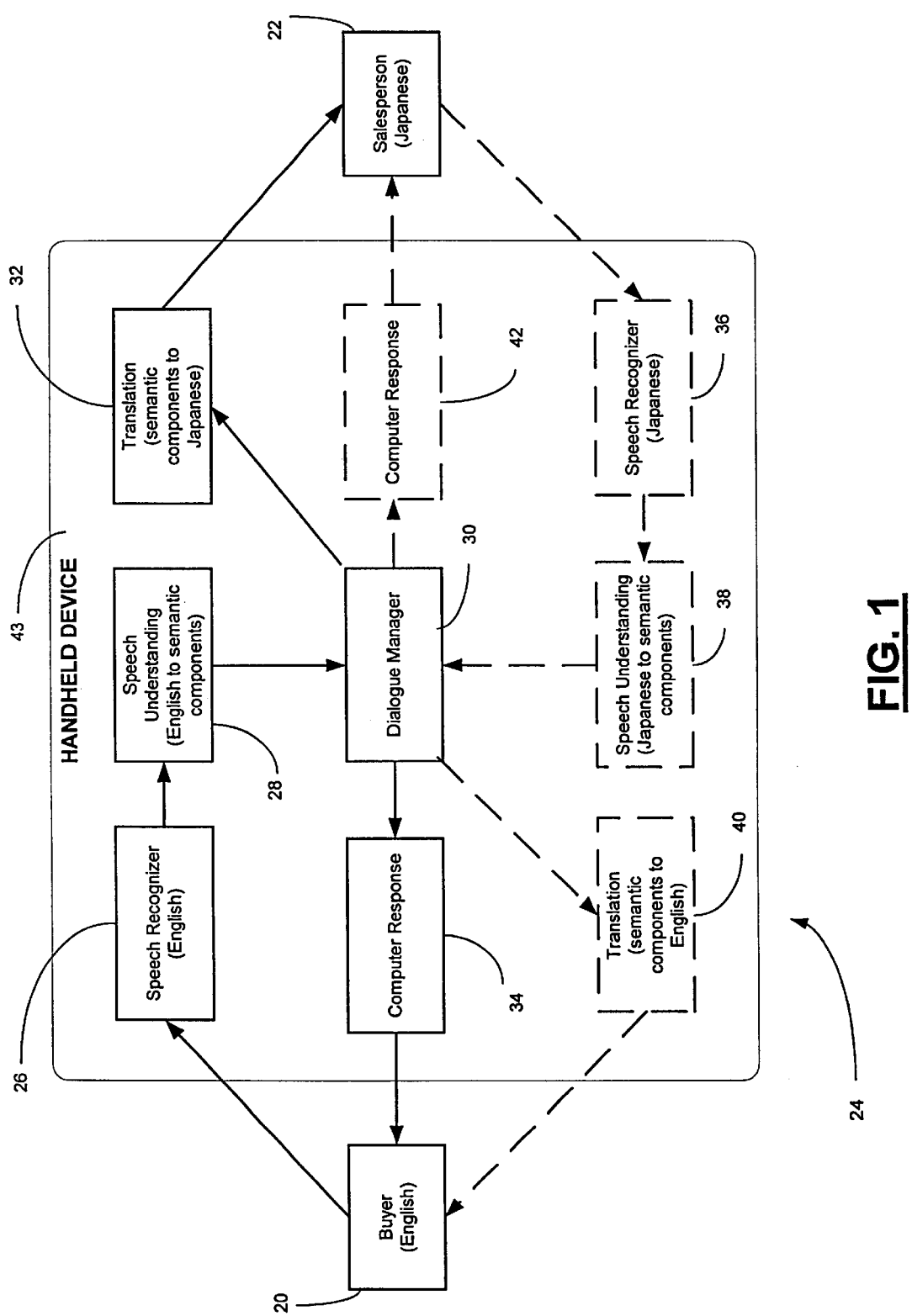
FIG. 1 is a block diagram depicting the computer-implemented components utilized to effect a dialog between at least two people with different languages.

FIG. 1 depicts a computer-implemented dialog continuous speech processing system for allowing two people who speak different languages to effectively communicate. In the non-limiting example of FIG. 1, a buyer 20 wishes to communicate with salesperson 22 in order to purchase a piece of merchandise. The difficulty arises in that buyer 20 speaks only English while salesperson 22 speaks only Japanese.

The dialog speech processing system 24 of the present invention uses a speech recognizer 26 to transform the English speech of buyer 20 into a string of words. The string of words is read as text by a speech understanding module 28 which extracts the semantic component of the string.

A dialog manager 30 determines whether a sufficient amount of information has been provided by buyer 20 based upon the semantic components determined by speech understanding module 28. If a sufficient amount of information has been provided, dialog manager 30 allows translation module 32 to translate the buyer's speech from the determined semantic components to Japanese. Translation module 32 translates the semantic components into Japanese and performs speech synthesis in order to vocalize the Japanese translation for salesperson 22 to hear.

Salesperson 22 then utilizes the dialog speech processing system 24 to respond to buyer 20. Accordingly, a Japanese speech recognizer 36 and Japanese speech understanding module 38 respectively perform speech recognition of the speech of salesperson 22 if insufficient information has been provided by salesperson 22.

If dialog manager 30 determines that an insufficient amount of information has been provided by buyer for accomplishing a predetermined goal (such as purchasing a piece of merchandise), dialog manager 30 instructs a computer response module 34 to vocalize a response which will ask the user to provide the missing piece(s) of information. An insufficient amount of information may arise from, but not limited to, an insufficiency with respect to a semantic level and/or a pragmatic level.

The preferred embodiment is suitable for implementation in a hand-held computer device 43 where the device is a tool allowing the user to formulate his or her request in the target language. Such a portable hand-held device is well suited for making a ticket/hotel reservation in a foreign country, purchasing a piece of merchandise, performing location directory assistance, or exchanging money. The preferred embodiment allows the user to switch from one task to another by selecting on the hand-held device which task they would like to perform. In an alternate embodiment, a flash memory card which is unique to each task can be provided so that a user can switch from one task to another. The user can preferably insert a flash memory card related to one task or domain and then remove it so that another flash memory card related to a second task can be used.

Figure 2:
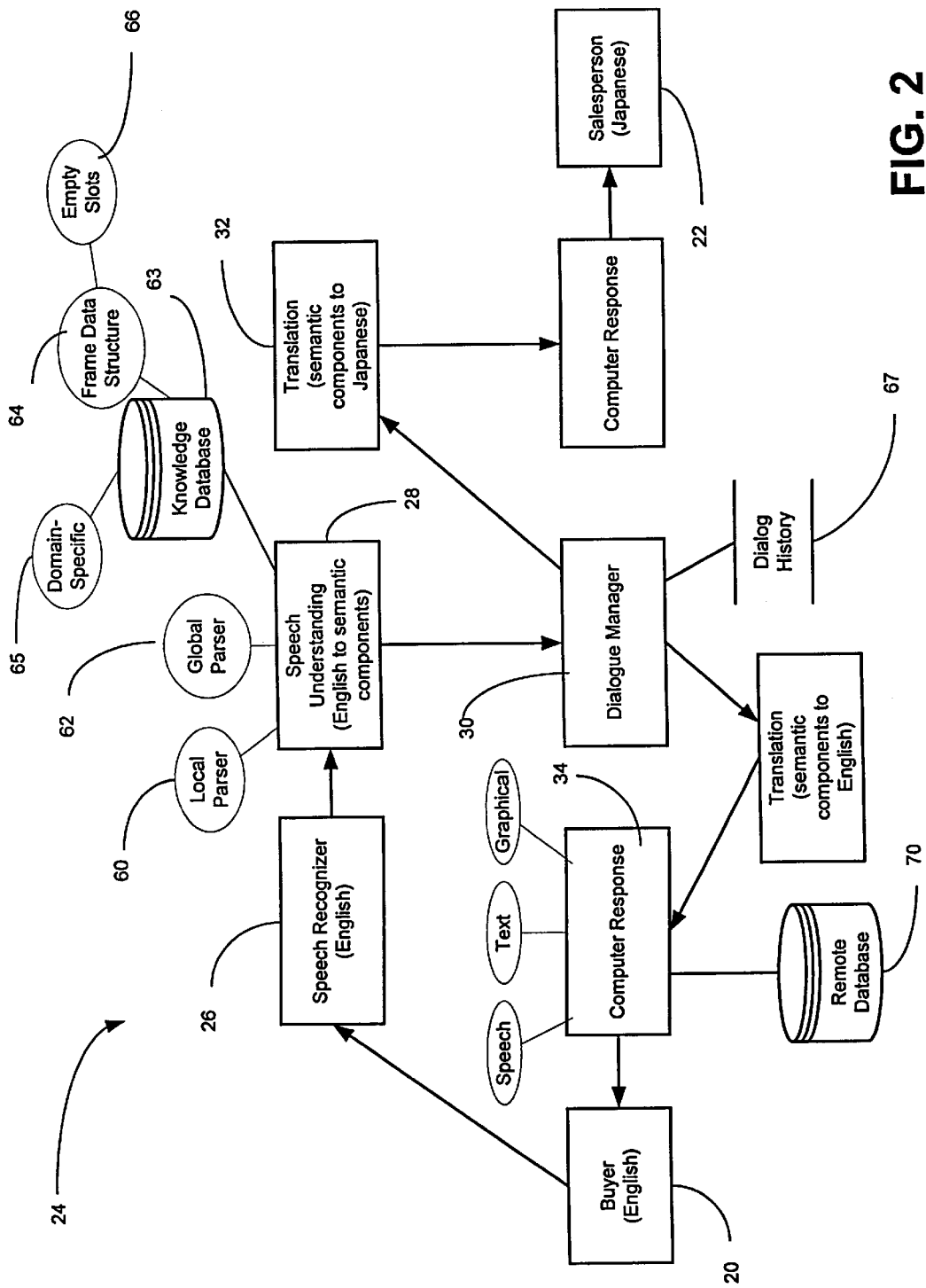
FIG. 2 is a block diagram depicting the components of the system of FIG. 1 in more detail.

FIG. 2 depicts components of the dialog speech processing system 24 in more detail. In particular, speech understanding module 28 includes a local parser 60 to identify predetermined relevant task-related fragments (preferably through a speech tagging method). Speech understanding module 28 also includes a global parser 62 to extract the overall semantics of the buyer's request and to solve potential ambiguities based upon the analysis performed by the local parser.

For example, the local parser recognizes phrases such as dates, names of cities, and prices. If a speaker utters "get me a flight to Boston on January 23rd which also serves lunch", the local parser recognizes: "flight" as an airplane trip; "Boston" as a city name; "January 23rd" as a date; and "lunch" as being about a meal. In the preferred embodiment, for example, the local parser associates "Boston" with a city name tag. The global parser assembles those items (airplane trip, city name, etc.) together and recognizes that the speaker wishes to take an airplane ride with certain constraints.

Speech understanding module 28 includes knowledge database 63 which encodes the semantics of a domain (i.e., goal to be achieved). In this sense, knowledge database 63 is preferably a domain-specific database as depicted by reference numeral 65 and is used by dialog manager 30 to determine whether a particular action related to achieving a predetermined goal is possible.

The preferred embodiment encodes the semantics via a frame data structure 64. The frame data structure 64 contains empty slots 66 which are filled when the semantic interpretation of global parser 62 matches the frame. For example, a frame data structure (whose domain is purchasing merchandise) includes an empty slot for specifying the buyer-requested price for the merchandise. If buyer 20 has provided the price, then that empty slot is filled with that information. However, if that particular frame needs to be filled after the buyer has initially provided its request, then dialog manager 30 instructs computer response module 34 to ask buyer 20 to provide a desired price.

The frame data structure 64 preferably includes multiple frame which each in turn have multiple slots. One frame may have slots directed to attributes of a shirt, such as, color, size, and prices. Another frame may have slots directed to attributes associated with the location to which the shirt is to be sent, such as, name, address, phone number. The following reference discusses global parsers and frames: J. Junqua and J. Haton, Robustness in *Automatic Speech Recognition* (Chapter 11: Spontaneous Speech), Kluwer Academic Publishers, Boston (1996); and R. Kuhn and R. De Mori, *Spoken Dialogues with Computers* (Chapter 14: Sentence Interpretation), Academic Press, Boston (1998).

The present invention includes dialog manager 30 using dialog history data file 67 to assist in filling in empty slots before asking the speaker for the information. Dialog history data file 67 contains a log of the conversation which has occurred through the device of the present invention. For example, if a speaker utters "get me a flight to Boston on January 23rd which also serves lunch", the dialog manager 30 examines the dialog history data file 67 to check what city names the speaker may have mentioned in a previous dialog exchange. If the speaker had mentioned that he was calling from Detroit, then the dialog manager 30 fills the empty slot of the source city with the city name of "Detroit". If a sufficient number of slots have been filled, then the present invention will ask the speaker to verify and confirm the flight plan. Thus, if any assumptions made by the dialog manager 30 through the use of dialog history data file 67 prove to be incorrect, then the speaker can correct the assumption.

Preferably, computer response module 34 is multi-modal in being able to provide a response to a user via speech synthesis, text or graphical. For example, if the user has requested directions to a particular location, the computer response could display a graphical map with the terms on the map being translated by translation module 40. Moreover, computer response module 40 can speak the directions to the user through speech synthesis. In one embodiment, computer response module 34 uses the semantics that have been recognized to generate a sentence in the buyer's target language based on the semantic concept. This generation process preferably uses a paired dictionary of sentences in both the initial and target language. In an alternate embodiment, sentences are automatically generated based on per type sentences which have been constructed from the slots available in a semantic frame. However, it is to be understood that the present invention is not limited to having all three modes present as it can contain one or more of the modes of the computer response module 34.

In another alternate embodiment computer response module 34 is instructed by dialog manager 30 to perform a search on the remote database 70 in order to provide buyer 20 with information about that piece of merchandise. In this non-limiting example, dialog manager 30 can instruct computer response module 34 to search the store's remote database 70 for the price range of the merchandise for which the buyer 20 is interested. The remote database 70 can perform communication with the dialogue manager through conventional methods, such as, via a radio frequency communication mode. The alternate embodiment substantially improves the quality of the dialog between buyer 20 and salesperson 22 by providing information to buyer 20 so that buyer 20 can formulate a more informed request to salesperson 22.

Dialog manager 30 assumes an integral role in the dialog by performing a back-and-forth dialog with buyer 20 before buyer 20 communicates with salesperson 22. In such a role, dialog manager 30 using the teachings of the present invention is able to effectively manage the turn-taking aspect of a human-like back-and-forth dialog. Dialog manager 30 is able to make its own decision about which direction the dialog with buyer 20 will take next and when to initiate when a new direction will be taken.

For example, if buyer 20 has requested a certain type of shirt within a specified price range, dialog manager 30 determines whether such a shirt is available within that price range. Such a determination may be made via remote database 70. In this example, dialog manager 30 determines that such a shirt is not available in the buyer's price range, however, another type of shirt is available in that price range. Thus, dialog manager 30 can determine whether a particular action or goal of the buyer is feasible and assist the buyer to accomplish that goal.

Figure 3A:
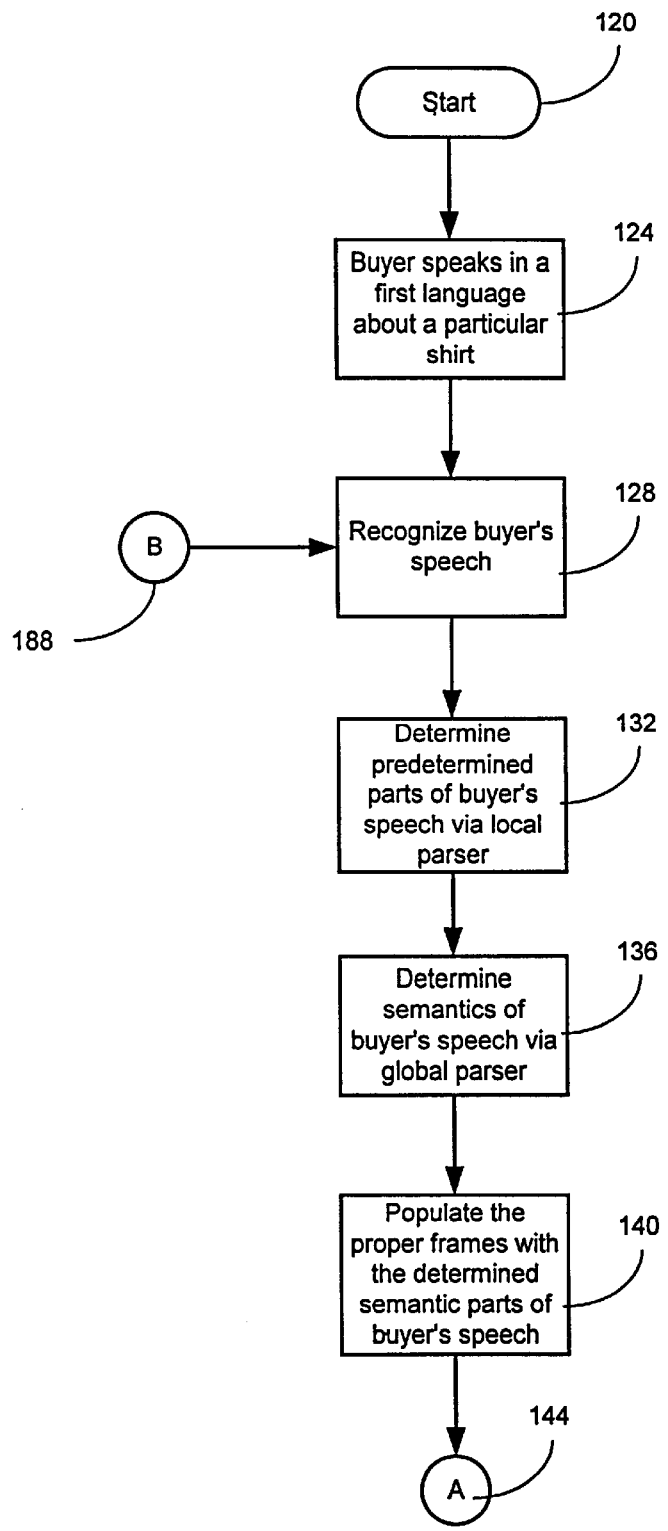
FIGS. 3a–3b are flow charts depicting the operational steps according to the teachings of the present invention for effecting a dialog between at least two people with different languages.
Figure 3B:
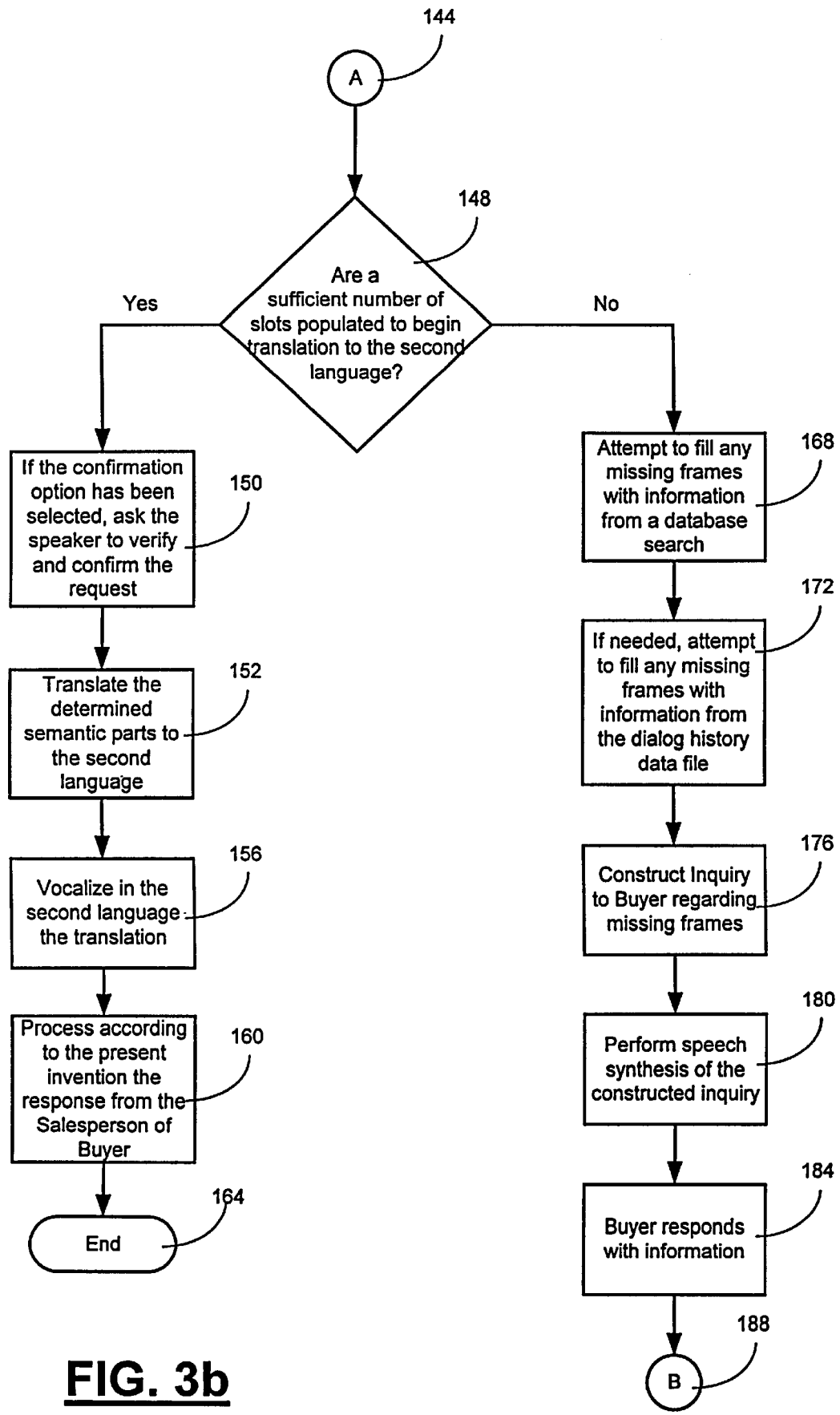

FIGS. 3a–3b depict operational steps associated with the dialog speech processing system of FIG. 2. Start indication block 120 indicates that process block 124 is to be processed. At process block 124, the buyer speaks in a first language (e.g. English) about a particular shirt. At process block 128, the present invention recognizes the buyer's speech, and at process block 132, predetermined words or phrases of the buyer's speech are determined, such as, phrases about shirt sizes or color.

Process block 136 determines the semantic parts of the buyer's speech through use of a global parser. Process block 140 populates the proper frames with the determined semantic parts of the buyer's speech. Processing continues at continuation block A 144.

With reference to FIG. 3b, continuation block A 144 indicates that decision block 148 is to be processed. Decision block 148 inquires whether a sufficient number of slots have been populated to begin in translation to a second language in order to communicate to the seller in the second language. If a sufficient number of slots have been populated, then process block 150 asks the speaker to verify and confirm the request to the seller. Preferably, the present invention permits a user to toggle the confirmation feature on or off according to the user's preference as to how quickly the user wishes the dialog exchange with another person to occur.

Process block 152 translates the determined semantic parts to the language of the seller. Process block 156 performs speech synthesis of the translation. Process block 160 then processes any subsequent responses from the salesperson according to the techniques of the present invention as well as any subsequent responses from the buyer. Processing terminates at end block 164.

However, if decision block 148 determines that a sufficient number of slots have not been populated, then processing continues at process block 168. Process block 168 attempts to fill any missing slots with information from a database search. If missing slots still exist, then the present invention attempts to fill any missing slots with information from the dialog history data file at process block 172.

If information is still missing, then process block 176 constructs an inquiry to the buyer regarding information to be supplied related to the missing slots. Process block 180 performs speech synthesis of the constructed inquiry. At process block 184, the buyer responds with the inquired information and processing continues at continuation block B 188 on FIG. 3a wherein the present invention recognizes the buyer's speech at process block 128.

Figure 4:
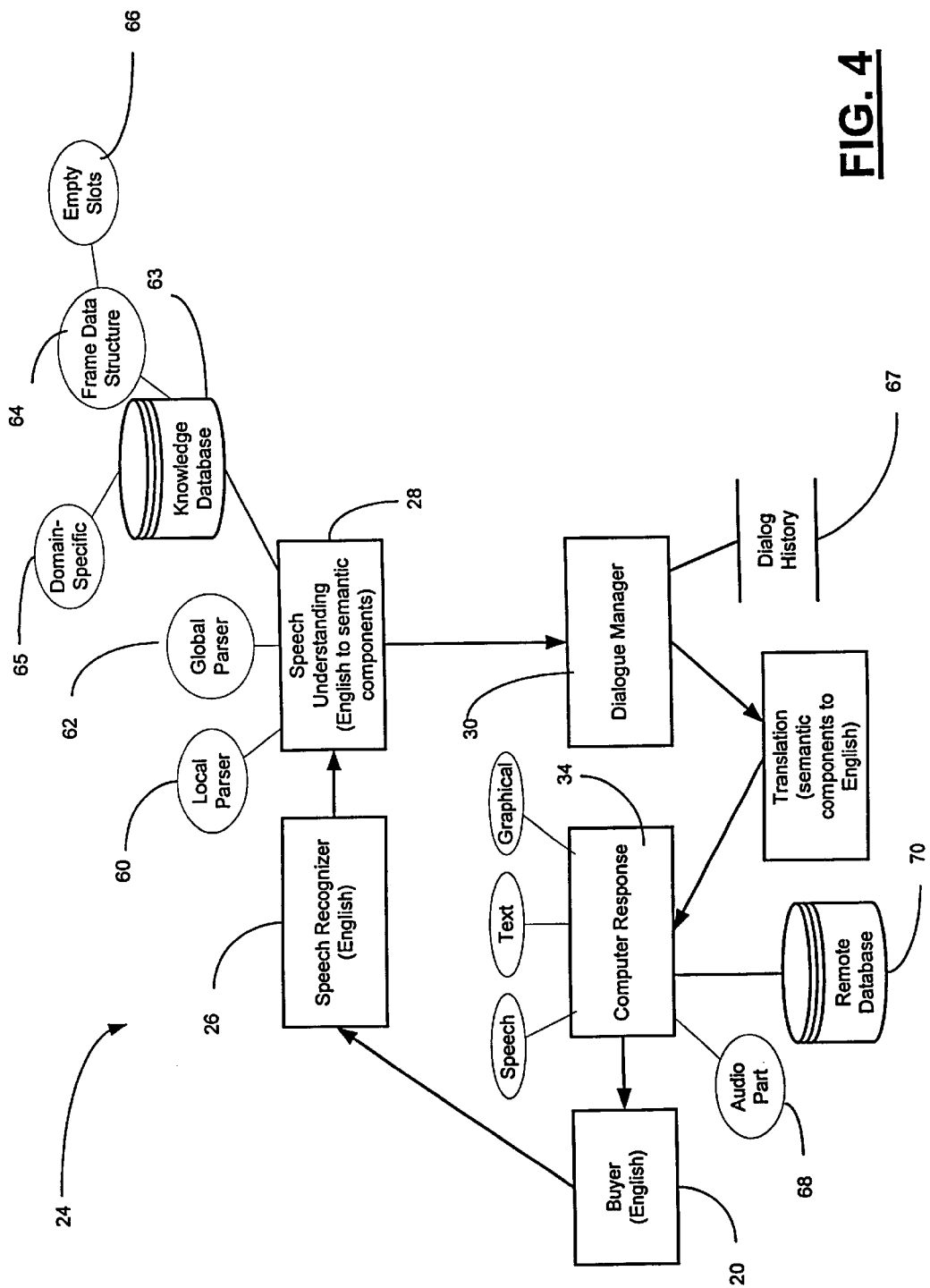
FIG. 4 is a block diagram depicting an alternate embodiment of the present invention wherein the dialog involves primarily one person.

FIG. 4 depicts an alternate embodiment of the present invention wherein the dialog is primarily between user 200 and the dialog speech processing system 24. In such an embodiment, dialog manager 30 assumes a more dominant role in the dialog in determining when turns are to be taken in the back-and-forth dialog. Local parser 60 and global parser 62 extract the meaningful information from the user's recognized speech in relation to the task at hand. Dialog manager 30 uses the domain-dependent knowledge database 63 which contains the task semantics in order to guide the user through the task or goal semantics.

The alternate embodiment is useful in such a situation as, for example, but not limited to, airplane reservations. In this non-limiting example, a speaker wishes to fly from Detroit to Boston, but the dialog manager 30 through remote database 70 learns that about twenty flights are planned which fit within the speaker's initial constraints. In such a situation, dialog manager 70 assumes a proactive role in the dialog by asking the speaker whether the speaker wishes to hear the flights in ascending order of price, or by asking the speaker what class he would like. Thus, the present invention is able to control and redirect the flow of the dialog with the speaker in order to achieve a predetermined goal.

Figure 5A:
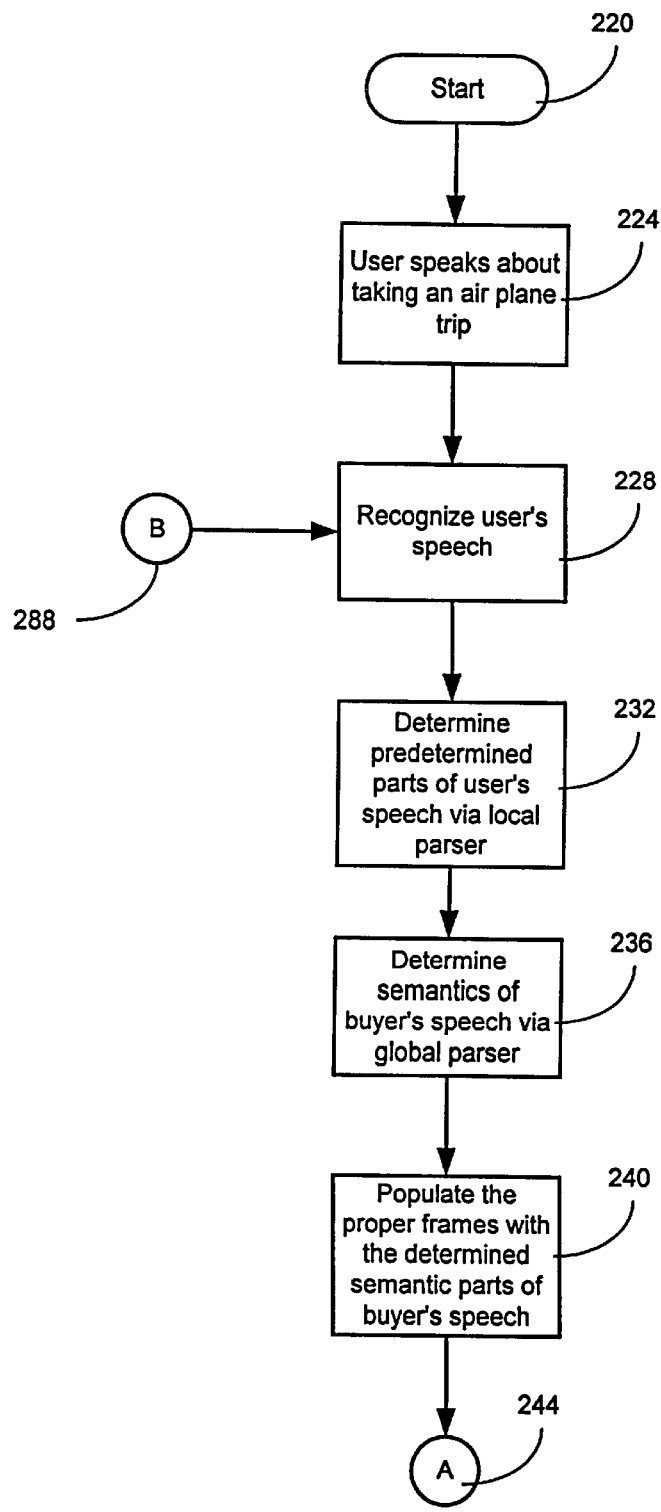
FIGS. 5a–5b are flow charts depicting the operational steps for the alternate embodiment of FIG. 4.
Figure 5B:
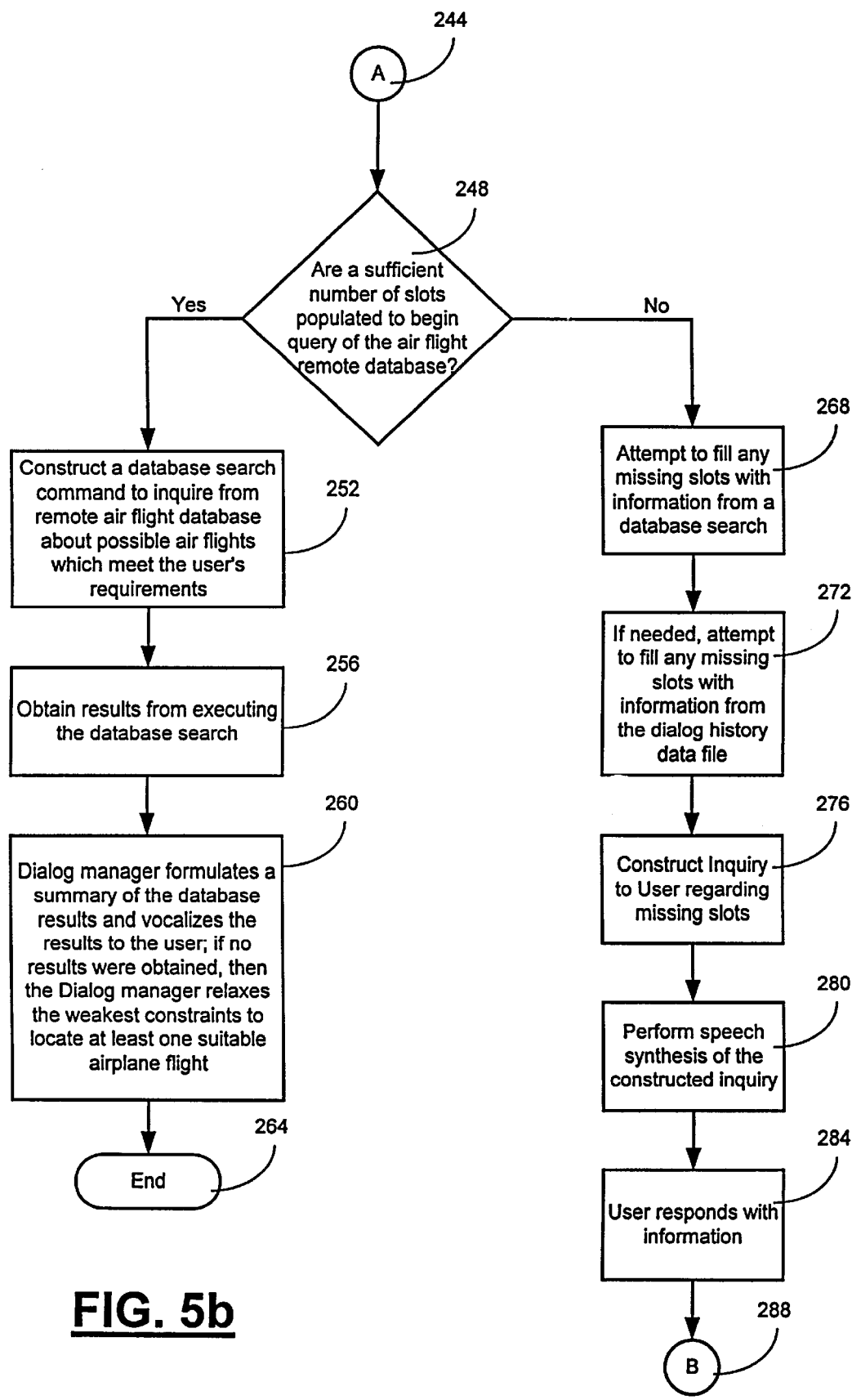

FIGS. 5a–5b depict operational steps associated with the alternate embodiment of FIG. 4 in the non-limiting context of a user desiring to take an airplane trip. With reference to FIG. 5a, start indication block 220 indicates that process block 224 is to be processed. At process block 224, a user speaks to the device of the present invention about taking an airplane trip. At process block 228, the user's speech is recognized by the present invention, and at process block 232, predetermined words or phrases of the buyer's speech are determined, such as, phrases about city destination or dates.

Process block 236 determines semantic parts of the user's speech by utilizing global parser. Process block 240 populates the proper frames with the determined semantic parts of the buyer's speech. Processing continues on FIG. 5b at continuation block A 244.

With reference to FIG. 5b, decision block 248 inquires whether a sufficient number of slots have been populated to begin query of the air flight remote database. Such a query may be made of a major airline's air flight database. If a sufficient number of slots have been populated to begin the query, process block 252 constructs a database search command based upon the semantic components of the frames. The database search inquires from the remote air flight database about possible air flights which meet the user's requirements. Process block 256 obtains results from the remote database, and at process block 260, the present invention performs speech synthesis of the database search results in order to vocalize the results to the user. Process block 260 also may formulate a summary of the database results and vocalize the results to the user. If no results were obtained, then the dialog manager preferably relaxes the weakest constraint to locate at least one suitable airplane flight. This feature of process block 260 is applicable, like the other features, to both the one-way and the multi-way dialog exchange embodiments of the present invention.

If the user does not prove additional speech input to the present invention, processing terminates at end block 264. However, if decision block 248 has determined that an insufficient number of slots have been populated to begin query of the air flight remote database, then process block 268 attempts to fill any missing slots with information from a search of the remote database. For example, if the user has specified the date of departure as well as the source and destination of the trip, but has not provided any information regarding desired time for departure or arrival, the present invention queries the remote database in order to find out the times associated with the planes departing from and arriving to the desired location. These times are communicated to the user.

If needed, process block 272 attempts to fill any missing slots with information from the dialog history data file. Process block 276 constructs an inquiry to be vocalized to the user regarding any missing slots which have not been able to be filled. Process block 280 performs speech synthesis of the constructed inquiry, and at process block 284, the user responds with the information. The present invention then processes the user's response by executing process block 228 of FIG. 5a.

While the invention has been described in its presently preferred form, it is to be understood that there are numerous applications and implementations for the present invention. Accordingly, the invention is capable of modification and changes without departing from the spirit of the invention as set forth in the appended claims.

It is claimed:

1. An apparatus for performing spoken translation in processing a spoken utterance from a user, comprising:

a speech recognizer for converting said spoken utterance into a digital format;

a speech understanding module connected to said speech recognizer for determining semantic components of said spoken utterance;

a dialogue manager connected to said speech understanding module for determining a condition of insufficient semantic information existing within said spoken utterance based upon said determined semantic components; and a speech translation module for generating a translation related to said insufficient semantic information, said generated translation being provided to said user in order for said user to utter to said speech recognizer a response related to said insufficient semantic information.

2. The apparatus of claim 1 further comprising:
a data structure for associating semantic components of said digitized spoken utterance with attributes indicative of a predetermined goal.

3. The apparatus of claim 2 further comprising:
a frame data structure for associating semantic components of said digitized spoken utterance with predetermined slots, said slots being indicative of data used to achieve a predetermined goal,
said slots being populated based upon said determined semantic components by said speech understanding module.

4. The apparatus of claim 3 wherein said speech recognizer converts said response from said user into a digital format,
said speech understanding module determining semantic components of said response in order to populate said frame data structure with information related to said insufficient semantic information.

5. The apparatus of claim 4 wherein said dialogue manager determines that sufficient semantic information exists and performs at least one computer-implemented activity related to said predetermined goal.

6. The apparatus of claim 5 wherein said computer-implemented activity is selected from the group consisting of performing hotel reservations via a remote database, purchasing a piece of merchandise via a remote database, performing location directory assistance via a remote database, exchanging money via a remote database, and combinations thereof.

7. The apparatus of claim 5 wherein said spoken utterance is spoken in a first language, said speech translation module generating a second translation in a second language based upon said determined semantic components, said computer-implemented activity including vocalizing said generated second translation.

8. The apparatus of claim 3 wherein said dialogue manager determines said condition of insufficient semantic information due to at least one of said slots being unpopulated.

9. The apparatus of claim 1 wherein said dialogue manager determines said condition of insufficient semantic information due to input to said speech recognizer from said user being insufficient with respect to a semantic level.

10. The apparatus of claim 9 wherein said dialogue manager determines said condition of insufficient semantic information due to input to said speech recognizer from said user being insufficient with respect to a pragmatic level.

11. The apparatus of claim 1 wherein a first spoken utterance is spoken in a first language, said speech translation module generating a translation in a second language based upon said determined semantic components.

12. The apparatus of claim 11 wherein a second spoken utterance is spoken by another user to said speech recognizer in said second language,
said speech understanding module determining second semantic components of said second spoken utterance,
said dialogue manager determining a second condition of insufficient semantic information existing within said second spoken utterance based upon said second determined semantic components,
said speech translation module generating a second translation in said second language related to said second insufficient semantic information,
said generated second translation being provided to said other user in order for said other user to utter to said speech recognizer a response related to said second insufficient semantic information.

13. The apparatus of claim 1 further comprising:
a computer response module for communicating via a predetermined communication mode said generated second translation to said user, said predetermined communication mode being selected from the group consisting of a textual display communication mode, a speech vocalization communication mode, a graphical communication mode, and combinations thereof.

14. The apparatus of claim 1 further comprising:
a remote database in communication with said dialogue manager for storing data related to a predetermined goal, said remote database providing said data to said dialogue manager.

15. The apparatus of claim 14 wherein said remote database communicates with said dialogue manager via a radio frequency communication mode.

16. The apparatus of claim 14 wherein said dialog manager formulates a first database request for said remote database to provide data related to said predetermined goal.

17. The apparatus of claim 16 wherein said dialog manager determines that said predetermined goal is substantially unattainable based upon said data from said remote database, said dialog manager determining what items in said remote database are substantially similar to said predetermined goal, said dialog manager communicating said items to said user via said speech translation module.

18. The apparatus of claim 17 wherein said spoken utterance of said user includes constraints related to said predetermined goal, said dialog manager formulating a second database request for said remote database in order to determine what items in said remote database are substantially similar to said predetermined goal, said dialog manager formulating said second database request by excluding from said second database request at least one of said constraints.

19. The apparatus of claim 16 wherein said dialog manager provides a summary of said data from said remote database to said user.

20. The apparatus of claim 1 further comprising:
a dialog history data file for storing a plurality of utterances of said user, said dialog manager determining information related to said insufficient semantic information via said dialog history data file.

21. The apparatus of claim 20 wherein said dialogue manager determines that a sufficient semantic information exists based at least in part upon the information determined via said dialog history data file, said dialogue manager performing at least one computer-implemented activity related to said predetermined goal.

22. The apparatus of claim 1 wherein said dialogue manager determines that a sufficient semantic information exists and communicates the determined semantic information to said user for user confirmation of accuracy of said determined semantic information, said dialogue manager performing at least one computer-implemented activity related to said predetermined goal after said user has confirmed the accuracy of said determined semantic information.

23. The apparatus of claim 22 wherein said computer-implemented activity is selected from the group consisting of performing hotel reservations via a remote database, purchasing a piece of merchandise via a remote database, performing location directory assistance via a remote database, exchanging money via a remote database, and combinations thereof.

24. The apparatus of claim 22 wherein said spoken utterance is spoken in a first language, said speech translation module generating a translation in a second language based upon said determined semantic components, said computer-implemented activity including vocalizing said translated first spoken utterance.

25. The apparatus of claim 1 further comprising:
a local parser connected to said speech understanding module for identifying predetermined speech fragments in said spoken utterance, said speech understanding module determining said semantic components based upon said identified speech fragments.

26. The apparatus of claim 25 wherein said local parser associates said speech fragments with predetermined tags, said tags being related to a predetermined goal.

27. The apparatus of claim 25 further comprising:
a global parser connected to said speech understanding module for determining said semantic components of said spoken utterance.

28. The apparatus of claim 27 further comprising:
a knowledge database for encoding the semantics of a predetermined domain, said domain being indicative of a predetermined goal,
said global parser utilizing said knowledge database for determining said semantic components of said spoken utterance.

29. The apparatus of claim 28 further comprising:
first and second computer-storage media for storing respectively a first and second knowledge database, said first and second knowledge database being related respectively to a first and second domain,
said first computer-storage medium being detachable from said global parser so that said second computer-storage medium can be used with said global parser.

30. The apparatus of claim 29 wherein said first and second computer-storage media are flash memory cards.

31. A method for performing spoken translation in processing a spoken utterance from a user, comprising:
converting said spoken utterance into a digital format;
determining semantic components of said spoken utterance;
determining a condition of insufficient semantic information existing within said spoken utterance based upon said determined semantic components; and
generating a translation related to said insufficient semantic information,
providing said generated translation to said user in order for said user to utter a response related to said insufficient semantic information.

* * * * *